US009152322B2

(12) United States Patent
Chen et al.

(10) Patent No.: US 9,152,322 B2
(45) Date of Patent: *Oct. 6, 2015

(54) FACILITATING NAVIGATION OF A WEBPAGE ON COMPUTER DEVICE

(75) Inventors: Li-Ju Chen, Taipei (TW); John J. Y. Hsu, Taipei (TW); Bor-Ping Pan, Taipei (TW); Rick M. F. Wu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 13/430,023

(22) Filed: Mar. 26, 2012

(65) Prior Publication Data

US 2012/0240031 A1 Sep. 20, 2012

Related U.S. Application Data

(63) Continuation of application No. 13/283,904, filed on Oct. 28, 2011.

(30) Foreign Application Priority Data

Oct. 29, 2010 (TW) .............................. 99137352 A

(51) Int. Cl.
*G06F 15/16* (2006.01)
*G06F 3/0488* (2013.01)
*H04L 29/06* (2006.01)
*H04L 29/08* (2006.01)

(52) U.S. Cl.
CPC ............ *G06F 3/04886* (2013.01); *H04L 29/06* (2013.01); *H04L 29/08072* (2013.01)

(58) Field of Classification Search
CPC .......................... H04L 29/08272; H04L 29/06
USPC .......................................................... 709/218
See application file for complete search history.

(56) References Cited

U.S. PATENT DOCUMENTS

| 6,593,944 | B1 | 7/2003 | Nicolas et al. |
| 7,516,412 | B1 | 4/2009 | de Waal et al. |
| 7,984,379 | B2 | 7/2011 | Wald |

(Continued)

FOREIGN PATENT DOCUMENTS

| CN | 101689200 A | 3/2010 |
| TW | 201217995 A | 5/2012 |

OTHER PUBLICATIONS

Chen et al, Adapting Web pages for Small-screen devices, Jan.-Feb. 2005, IEEE Computer Society, 1089-7801, pp. 51-56.*

(Continued)

*Primary Examiner* — Chris Parry
*Assistant Examiner* — Weiwei Stiltner
(74) *Attorney, Agent, or Firm* — Cuenot, Forsythe & Kim, LLC

(57) ABSTRACT

A method of Webpage navigation can include a computer device loading a Webpage having at least a first portion and a second portion, arranging the Webpage in order to present the first portion in the display area of the computer device and to place the second portion out of the display area, and presenting a navigation map corresponding to the Webpage in the display area. In response to a control command input with respect to the navigation map, the Webpage can be arranged in order to present the second portion in the display area.

10 Claims, 13 Drawing Sheets

(56) References Cited

U.S. PATENT DOCUMENTS

| | | |
|---|---|---|
| 2002/0138831 A1 | 9/2002 | Wachtfogel et al. |
| 2003/0038836 A1 | 2/2003 | Ronald et al. |
| 2003/0055722 A1* | 3/2003 | Perreault et al. ............... 705/14 |
| 2003/0177096 A1 | 9/2003 | Trent et al. |
| 2003/0191729 A1* | 10/2003 | Siak et al. ...................... 706/45 |
| 2003/0217121 A1 | 11/2003 | Willis |
| 2006/0020883 A1 | 1/2006 | Kothari et al. |
| 2006/0206832 A1 | 9/2006 | Celik et al. |
| 2007/0033634 A1 | 2/2007 | Leurs et al. |
| 2007/0083810 A1* | 4/2007 | Scott et al. ..................... 715/525 |
| 2007/0219945 A1 | 9/2007 | Wang et al. |
| 2008/0201242 A1 | 8/2008 | Minnis et al. |
| 2009/0204900 A1 | 8/2009 | Champion et al. |
| 2009/0248511 A1* | 10/2009 | Mehta et al. .................... 705/14 |
| 2009/0254834 A1 | 10/2009 | Wald |
| 2009/0254838 A1 | 10/2009 | Rao et al. |
| 2009/0287566 A1* | 11/2009 | McAfee ..................... 705/14.41 |
| 2010/0016050 A1 | 1/2010 | Snow et al. |
| 2010/0070872 A1* | 3/2010 | Trujillo ........................ 715/745 |
| 2010/0188335 A1 | 7/2010 | Priddle et al. |
| 2010/0268796 A1* | 10/2010 | Wood et al. ................... 709/219 |
| 2011/0078174 A1* | 3/2011 | Lee et al. ...................... 707/769 |
| 2011/0113364 A1* | 5/2011 | Neil et al. ..................... 715/802 |
| 2011/0218858 A1* | 9/2011 | Christensen ............... 705/14.51 |
| 2012/0017000 A1* | 1/2012 | Lim .............................. 709/229 |
| 2012/0089899 A1* | 4/2012 | Palaima et al. ............... 715/234 |
| 2012/0096048 A1* | 4/2012 | Patch et al. ................... 707/803 |
| 2012/0110125 A1 | 5/2012 | Chen et al. |

OTHER PUBLICATIONS

U.S. Appl. No. 13/283,904 Non-Final Office Action, May 24, 2013, 12 pgs.

Liu, S., et al., "KNM: A Novel Intelligent User Interface for Webpage Navigation," AIRS 2005, LNCS 3689, pp. 641-646, 2005 [retrieved Oct. 3, 2011] retrieved from the Internet: <http://www.springerlink.com/content/p614n8607224311w/abstract/?target=print>.

"Gecko Plugin API Reference—MDN," Mozilla Developer Network, 2011, retrieved from the Internet: <https://developer.mozilla.org/en/Gecko_Plugin_API_Reference#>, 9 pages.

"HTML Element," [online] Wikipedia, the free encyclopedia, Sep. 22, 2011, [retrieved Oct. 3, 2011] retrieved from the Internet: <http://en.wikipedia.org/wiki/HTML_element>, 25 pgs.

U.S. Appl. No. 13/283,904, Non-Final Office Action, Jan. 22, 2014, 11 pg.

U.S. Appl. No. 13/283,904, Advisory Action, May 15, 2014, 3 pg.

U.S. Appl. No. 13/283,904, Final Office Action, Sep. 30, 2014, 11 pg.

U.S. Appl. No. 13/283,904, Notice of Allowance, May 20, 2015, 11 pg.

* cited by examiner

FACILITATING NAVIGATION OF A WEBPAGE ON COMPUTER DEVICE

CROSS-REFERENCE TO RELATED APPLICATIONS

This application is a Continuation of U.S. application Ser. No. 13/283,904, filed on Oct. 28, 2011, which claims the benefit of priority from Taiwan Patent Application 99137352, filed on Oct. 29, 2010, both of which are fully incorporated herein by reference.

BACKGROUND

The present invention relates to a mechanism for assisting a user in navigating a Webpage.

Web browsers, such as Internet Explorer™ of Microsoft™ or Chrome™ of Google™, become application programs indispensable to a computer device. Navigation of Webpages or electronic documents is no longer limited to a personal computer or a notebook computer. Webpages can be read on plenty of commercially available handheld devices. For example, Web browser Safari™ or Web browser Opera Mini™ can be installed on iPhone™ of Apple™.

All the aforesaid Web browsers allow a user to adjust a display ratio of a Webpage. If a Webpage cannot be fully presented in a display area (or window) at a display ratio, the Web browsers provide a scroll bar for scrolling the Webpage vertically and horizontally so as to present every portion of the Webpage.

Shiguang Liu, Hua-Jun Zeng, Zheng Chen, Chuangbai Xiao, Wei-Ying Ma, KNM: *A Novel Intelligent User Interface for Webpage Navigation*, AIRS 2005: 641-646, and U.S. Patent Application US2007/0219945 propose a key-phrase navigation map (KNM) whereby a key-phrase in a Webpage is identified by an algorithm of relevancy and then provided for users as a reference in browsing the Webpage. However, the method is dependent upon whether the algorithm is appropriately designed and is likely to omit certain details.

BRIEF SUMMARY

An embodiment can include a method for facilitating navigation of a Webpage on a computer device having a display. The display can have a display area. The method can include loading by the computer device a Webpage having at least a first portion and a second portion, arranging the Webpage in order to present the first portion in the display area of the computer device and to place the second portion out of the display area, and presenting a navigation map corresponding to the Webpage in the display area. The method further can include arranging the Webpage in response to a control command input with respect to the navigation map in order to present the second portion in the display area.

Another embodiment can include a method for processing Webpages. The method can include providing a Webpage having at least one object, identifying the object to determine a corresponding meta data, and uploading the meta data and the Webpage to a Web server, whereby a computer device accesses the Web server to download the Webpage and the meta data embedded in the Webpage.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
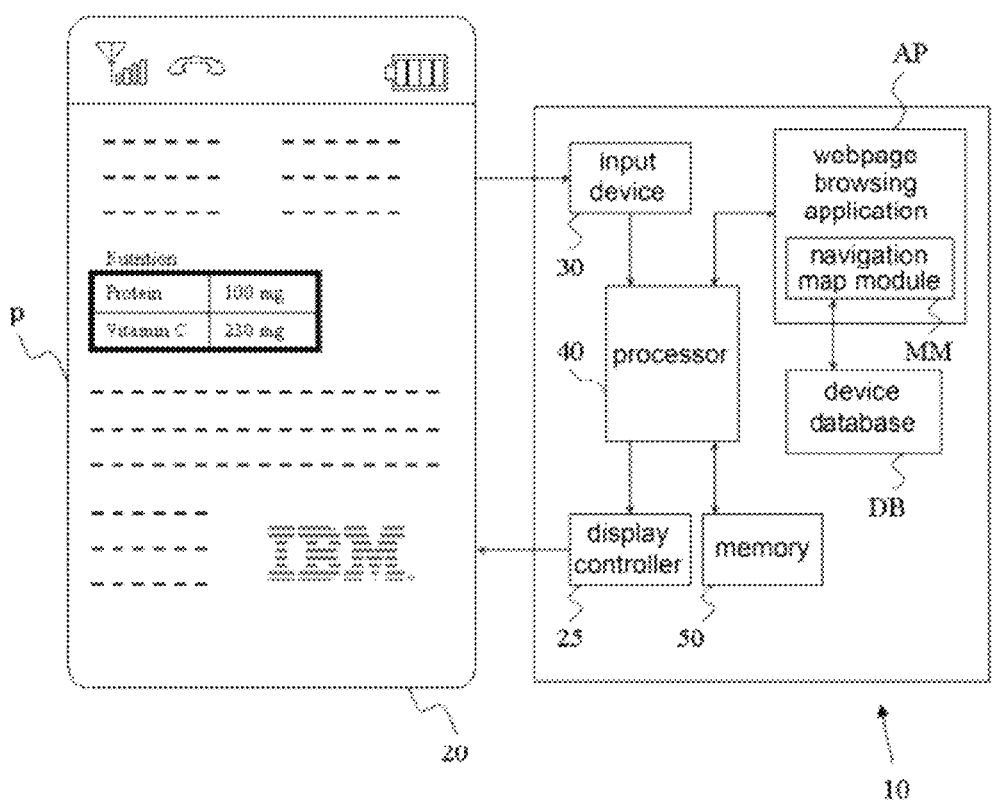
FIG. 1 is a schematic view of a computer device according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 7, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An aspect of the present invention enables a user reading a Webpage to go rapidly to a position therein when information that interests the user is available at the position.

Another aspect of the present invention enables a user reading a Webpage to determine rapidly whether the Webpage contains information that interests the user.

Yet another aspect of the present invention achieves the aforesaid objectives by adding to a Webpage a meta data related to an object.

In an embodiment of the present invention, a method for facilitating navigation of a Webpage on a computer device, the computer device comprising a display, the display having a display area, the method comprising: loading by the computer device a Webpage having at least a first portion and a second portion; arranging the Webpage in order to present the first portion in the display area and to place the second portion out of the display area; presenting a navigation map corresponding to the Webpage in the display area; and arranging the Webpage in response to a control command input with respect to the navigation map in order to present the second portion in the display area. In particular, the computer device compares a meta data corresponding to a Webpage object in the second portion with a user preference data. If it is determined that the meta data conforms with the user preference data, the step of presenting the navigation map further comprises presenting the pointer corresponding to a Webpage object in the navigation map.

Furthermore, the embodiment proposes a computer device provided for navigation of a Webpage. A Webpage browsing application of the computer device has a navigation map module for performing the method described above. In particular, the display of the computer device is a touchscreen with a resolution of X*Y pixels, wherein both X and Y are less than 800 or less than 1024.

In another embodiment of the present invention, a method for processing Webpages comprises: providing a Webpage having at least one Webpage object; identifying the Webpage object to determine a corresponding meta data; and uploading the meta data and the Webpage to a Web server, whereby a computer device accesses the Web server to download the Webpage and the meta data embedded in the Webpage. In particular, the step of embedding the meta data involves using <meta> tags in HTML.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Hardware Structure

FIG. 1 is a block diagram of a hardware structure of a computer device 10 according to a specific embodiment of the present invention. The computer device 10 comprises a display 20, a display controller 25, an input device 30, a processor 40, and a memory 50. Please refer to handheld device products of Apple™, such as iPhone™, or handheld device products of Nokia™, such as N800 Internet Tablet, for further details of the hardware structure of the computer device 10. The display 20 integrates with the input device 30 to form a touchscreen, such that a user can directly enter a control command to the display 20 by touching the display 20.

Conventional Webpages are designed for use with standard monitors, and thus conventional Webpages are usually of a width of 800 pixels or 1024 pixels. However, to enhance its portability, the display of a handheld device, such as iPhone™, usually has a smaller display area than a standard monitor does, and usually has a limited resolution, such as 960×640 pixels or 320×480 pixels. Hence, Webpages of a width of 800 pixels or 1024 pixels cannot be fully displayed on the handheld device without reducing the display ratio of the Webpages first; for this reason, each of the Webpages is fully presented by means of a scroll bar for scrolling the Webpages vertically and horizontally, which is inconvenient indeed. However, if the display ratio of the Webpages is reduced, the words in the Webpages will be too small to be legible.

A point to note is that the computer device of the present invention is not restricted to handheld devices. Hence, the computer device 10 can be one of the following devices: computer product Acer™ Gateway ZX6810 of Acer™, computer product T91 Tablet of ASUS™, and computer product 1420P-232G32n of Acer™. Another point to note is that the computer device of the present invention is not necessarily equipped with a touchscreen.

Referring to FIG. 1, the processor 40 can execute a Webpage browsing application AP. The Webpage browsing application AP could be referred to a commercially available Web browser, such as Internet Explorer™, Firefox™, Chrome™, Safari™, Opera™, or Opera Mini™. A navigation map module MM can be selectively plugged in to the Webpage browsing application AP, and can be started or shut down as decided by the user. The navigation map module MM maintains a device database DB. In this embodiment, the navigation map module MM is a plug-in. Please refer to https://developer.mozilla.org/en/Gecko_Plugin_API_Reference for a description as to how a Web browser plug-in is developed. In another embodiment, the navigation map module MM comes in the form of a stand-alone application program.

Navigation Map

Figure 2A:
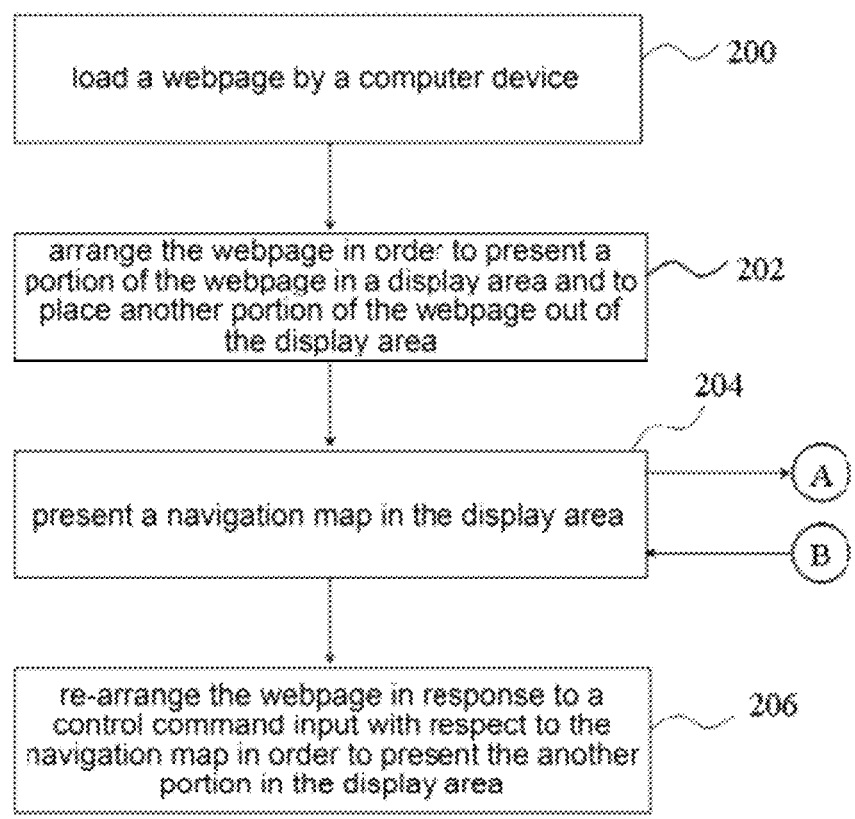
FIG. 2A is a flowchart of a method according to a specific embodiment of the present invention.

Referring to FIG. 1 and FIG. 2A, there is shown in FIG. 2A a flowchart of a method according to a specific embodiment of the present invention. In step 200, a Webpage P is loaded by the Webpage browsing application AP of the computer device 10. The Webpage P is divided into a plurality of portions which do not overlap. The portions contain their respective Webpage elements, such as titles, text, pictures, animations, or tables. Reference for the details of the "Webpage elements" described herein is, for example, found in Wikipedia™ which gives an definition of "HTML element" (see http://en.wikipedia.org/wiki/HTML_element). For example, the "Webpage elements" described herein also include the elements defined in XHTML. Also, a Webpage element may include any other Webpage element. In general, every Webpage element defined in a Webpage programming language and derived from HTML should fall within the scope of the present invention.

Figure 2B:
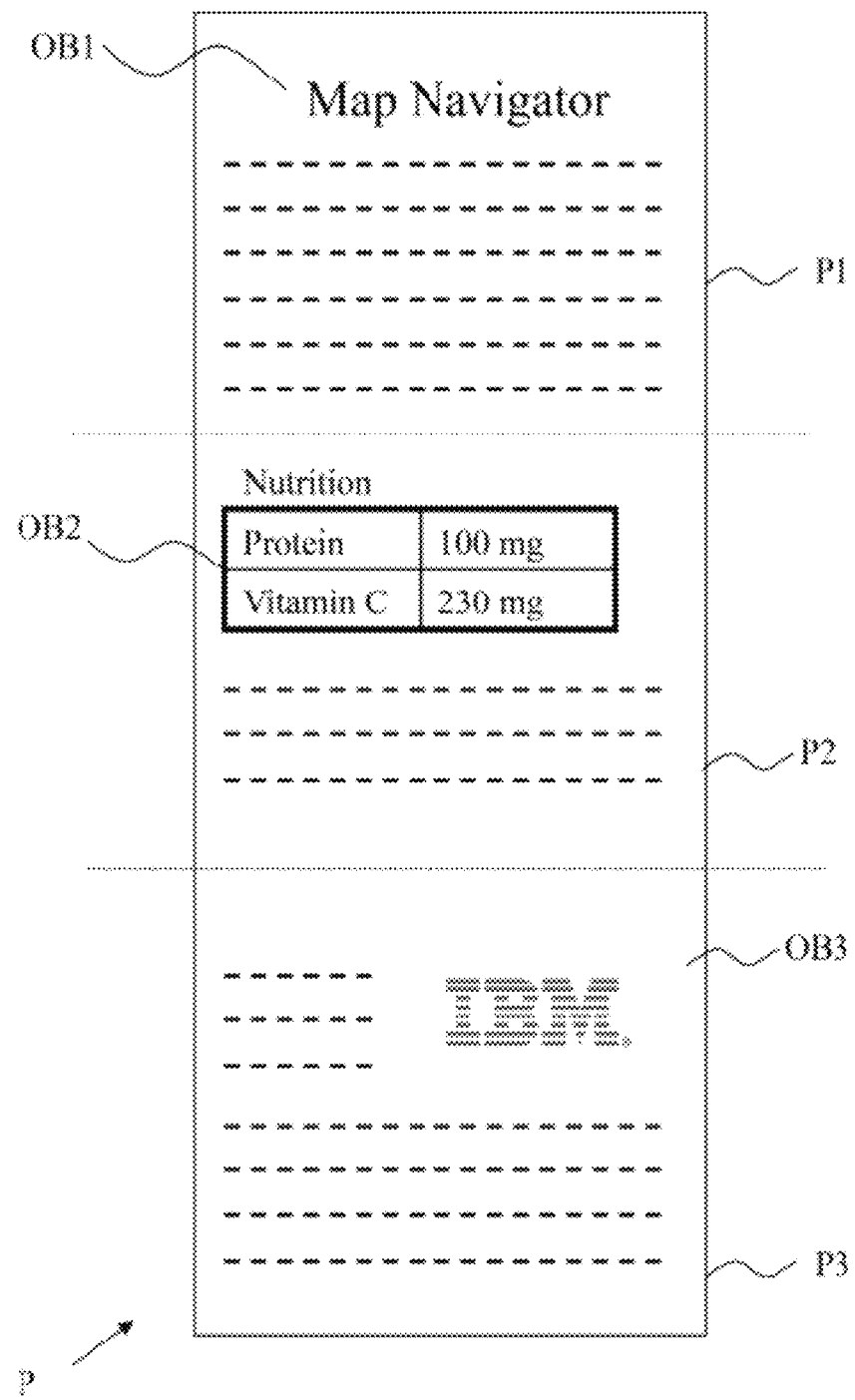
FIG. 2B shows a Webpage according to a specific embodiment of the present invention.

In step 202, the Webpage browsing application AP arranges the Webpage P according to a default setting, such that a first portion P1 is presented in the display area of the display 20, and a second portion P2 is placed out of the display area, that is, not displayed. For example, as shown in FIG. 2B, the Webpage P is equally divided into three portions, that is, a top portion P1, a middle portion P2, and a bottom portion P3. Once the Webpage P is loaded by the Webpage browsing application AP, the top portion P1 will be displayed in accordance with a default display ratio, and then the user has to "scroll" the Webpage P without changing the display ratio, such that the middle portion P2 or the bottom portion P3 will be displayed in the display area.

Figure 2C:
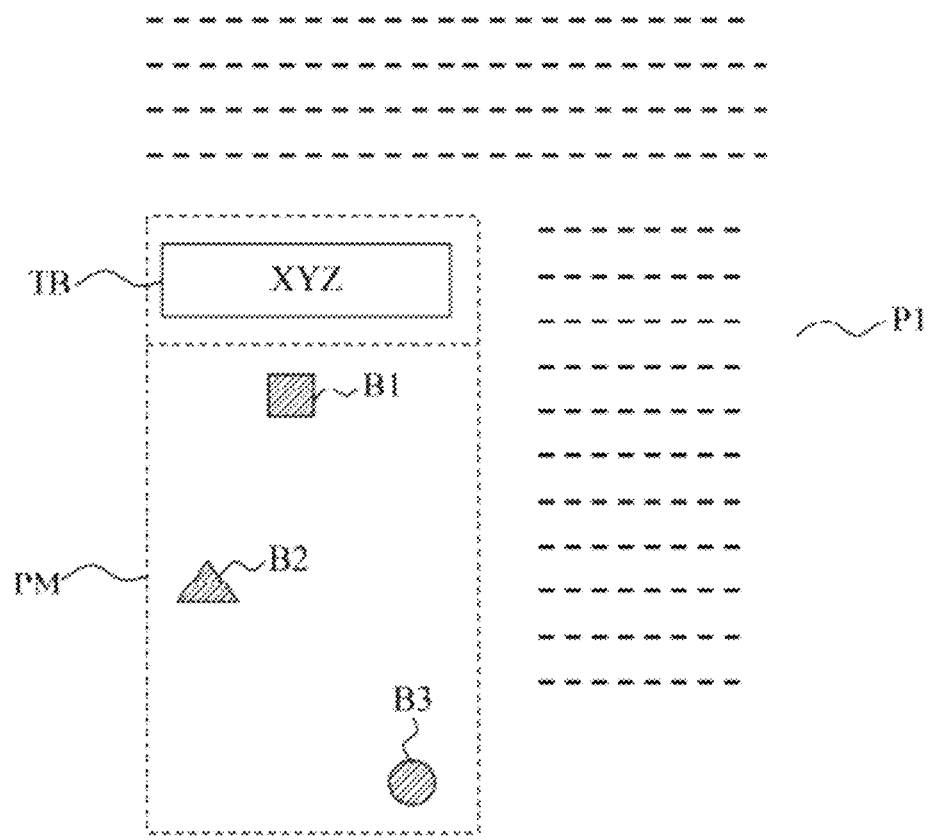
FIG. 2C shows a navigation map according to a specific embodiment of the present invention.

In step 204, a navigation map PM is presented in the display area of the display 20. As shown in FIG. 2C, with a preset transparency it manifests, the navigation map PM covers the Webpage P or, in a not-shown example, the navigation map PM can lie alongside the Webpage P. Alternatively, it is feasible for the navigation map PM to present in the same way as the key-phrase navigation map (KNM) mentioned in US Patent Application US2007/0219945 does.

The navigation map PM is produced with respect to the Webpage P; in other words, the navigation map PM always has a portion corresponding to different portions P1-P3 (regardless of whether they are presented in the display area) of the Webpage P. In an embodiment, the navigation map PM has a geometrical ratio (such as an aspect ratio) corresponding to a geometrical ratio of the Webpage P; however, this feature is not essential to the present invention, especially when the aspect ratio of the Webpage P is special. In general, it is sufficient for the Webpage P to be rectangular and the navigation map PM to be rectangular in a way similar to the Webpage P.

In step 206, the user uses the input device 30 (such as a touchscreen) to enter a control command with respect to the navigation map PM. For example, the user touches (or clicks on) the bottom region of the navigation map PM, and the Webpage browsing application AP rearranges the Webpage P in response to the control command, such that the bottom portion P3 is presented in the display area provided by the display 20; meanwhile, if the preset display ratio remains unchanged, the middle portion P2 and the top portion P1 presented in step 202 will not show up in the display area of the display 20. In another embodiment, in step 206, the Webpage browsing application AP can also adjust the display ratio to enable part or all of the middle portion P2 and/or part or all of the top portion P1 to be presented in the display area together with the bottom portion P3.

Map Pointer

In the aforesaid embodiment, it is not necessary for every portion of the navigation map PM to be presented to the user through an additional pointer, because the user can determine the presented portions P1-P3 of the Webpage P according to a relative position of the navigation map PM. In an embodiment not shown, the navigation map PM has the pointers corresponding to different portions P1-P3 of the Webpage P; hence, the user can directly click on or touch the pointers, such that corresponding portions P1-P3 of the Webpage P are presented in the display area.

Preferably, as shown in FIG. 2C, the navigation map PM has the pointers corresponding to different Webpage objects in the Webpage P; hence, the user can directly click on or touch the pointers such that the corresponding Webpage objects are presented in the display area. For example, as shown in FIG. 2B, the top portion P1 of the Webpage P has an object OB1 (such as a title), the middle portion P2 of the Webpage P has an object OB2 (such as a table), and the bottom portion P3 of the Webpage P has an object B3 (such as a picture). As shown in FIG. 2C, buttons B1-B3 (that is, map pointers) corresponding to the objects OB1-OB3 are disposed in the navigation map PM. For example, the Webpage browsing application AP rearranges the Webpage P as soon as the user touches the button B3 in step 206, such that a picture OB3 located at the bottom portion P3 is presented in the display area provided by the display 20. Preferably, the picture OB3 is presented at the center of the display area or any other predetermined positions. Alternatively, the display ratio of the Webpages is adjusted according to the dimensions of the picture OB3. For example, the display area is fully filled with the picture OB3; in such a situation, the bottom portion P3 is not necessarily presented in its entirety in the display area. Nonetheless, in doing so, the user can read the picture OB3 or any other noteworthy Webpage objects clearly.

To enable the user to discern the buttons B1-B3, the buttons B1-B3 come in different colors, shapes or even sizes. Also, after the user has touched (or clicked on) the buttons B1-B3, the buttons B1-B3 change their appearances or even become hidden. In addition to the buttons, the map pointer can also come in the form of an icon, text, or title, because the embodiment of the map pointer is not limited by the present invention.

Preferably, as shown in FIG. 2C, the pointers (such as buttons B1-B3) in the navigation map PM correspond to the positions of the objects OB1-OB3 in the Webpage P, though this feature is not essential to the present invention. Also, the navigation map module MM determines whether to present the buttons B1-B3 in the navigation map PM, which is further illustrated with the embodiments below.

Meta Data of Webpage Objects

Figure 3A:
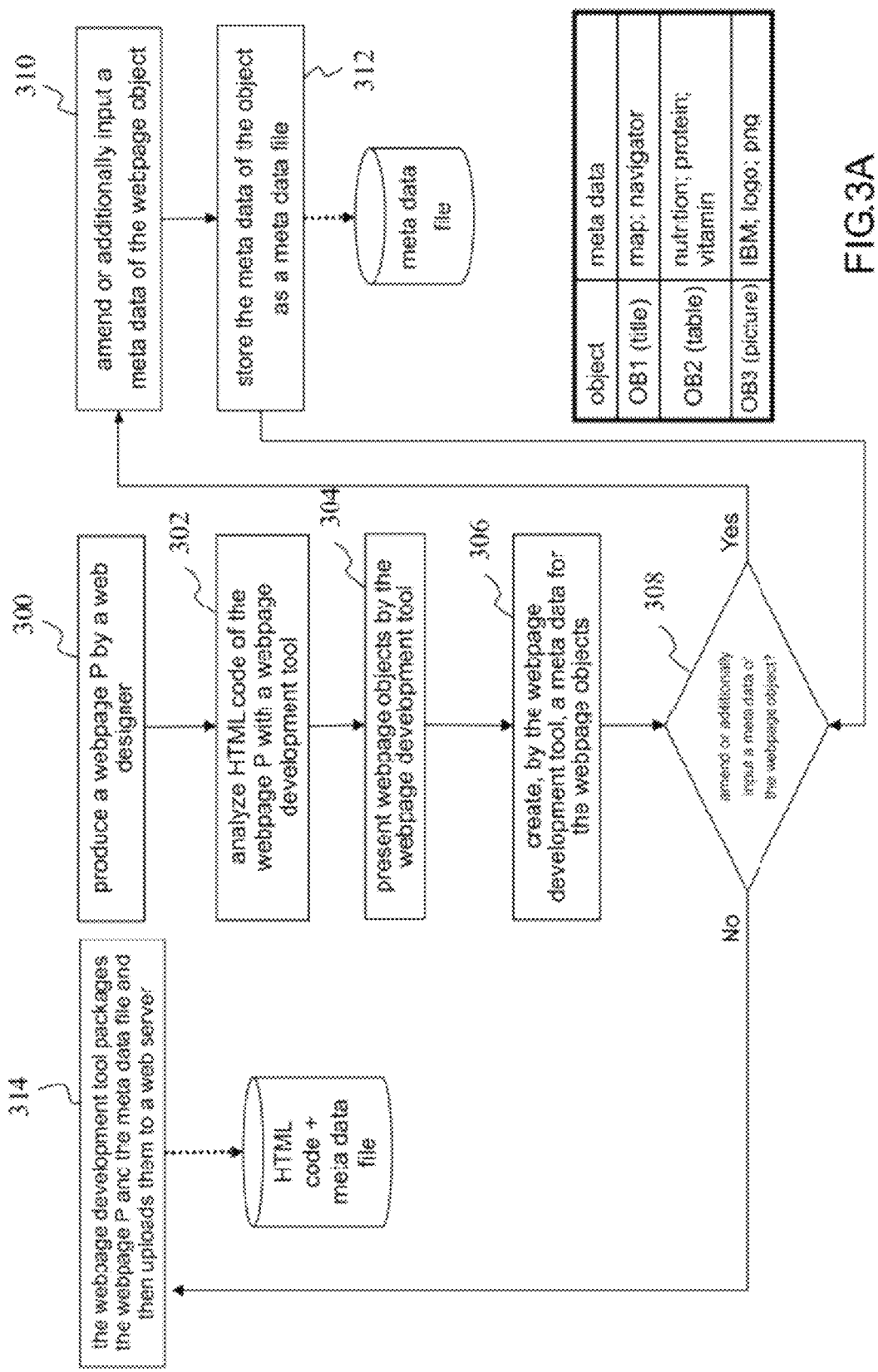
FIG. 3A is a flowchart of a method according to a specific embodiment of the present invention.

Referring to FIG. 3A, there is shown a flowchart of a method according to a specific embodiment of the present invention. The method is for processing Webpages in a manner that the Webpages can be read by the navigation map module MM, such that it is feasible to determine whether to present a map pointer (such as the buttons B1-B3 shown in FIG. 2C) in the navigation map PM.

In step 300, the Webpage P is provided. In this step, a Web designer can produce the Webpage P with a conventional Webpage design software (such as Frontpage™ of Microsoft™). The Webpage P has at least one Webpage object, such as a title, text, picture, animation, table, etc. A point to note is that, all the steps that follow step 300 are mainly intended for the navigation map module MM; in other words, in any embodiment that does not require any step that follow step 300, the Webpage provided in step 300 can be read by just a conventional Web browser.

Figure 3B:
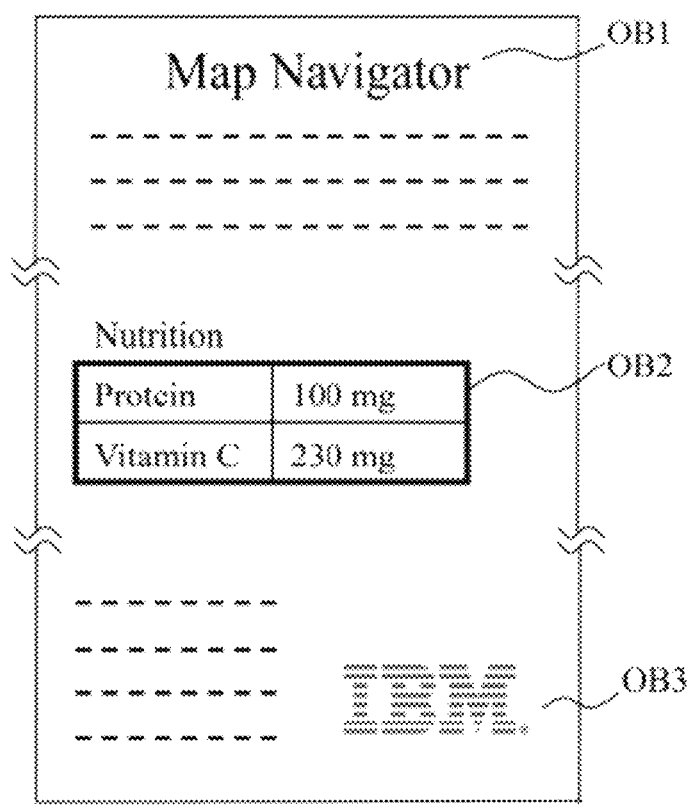
FIG. 3B shows a Webpage according to a specific embodiment of the present invention.

Referring to FIG. 3B, there is shown the Webpage P presented in a conventional Web browser according to a specific embodiment of the present invention. As shown in FIG. 3B, the Webpage P has at least three Webpage objects, that is, a title OB1, a table OB2, and a picture OB3. The HTML code of the Webpage P is shown below, wherein the Webpage objects are indicated by italics.

```
<html>
<head>
</head>
<body>
<h2>Map Navigator</h2>
<br />
<br />
Nutrition
<br />
<table style="border-collapse: collapse; width: 50%; border: 1px solid black;">
<tbody>
    <tr>
        <td style="border: 1px solid black;">Protein<br /></td>
        <td style="border: 1px solid black;">100 mg<br /></td>
    </tr>
    <tr>
        <td style="border: 1px solid black;">Vitamin C<br /></td>
        <td style="border: 1px solid black;">230 mg<br /></td>
    </tr>
</tbody>
</table>
<br />
This is an IBM logo picture
<br />
<img border="0px" alt="IBM_Logo" title="IBM_Logo" src="http://upload.wikimedia.org/wikipedia/commons/thumb/5/51/IBM_logo.svg/120px-IBM_logo.svg.png" />
<br />
</body>
</html>
```

Figure 3C:
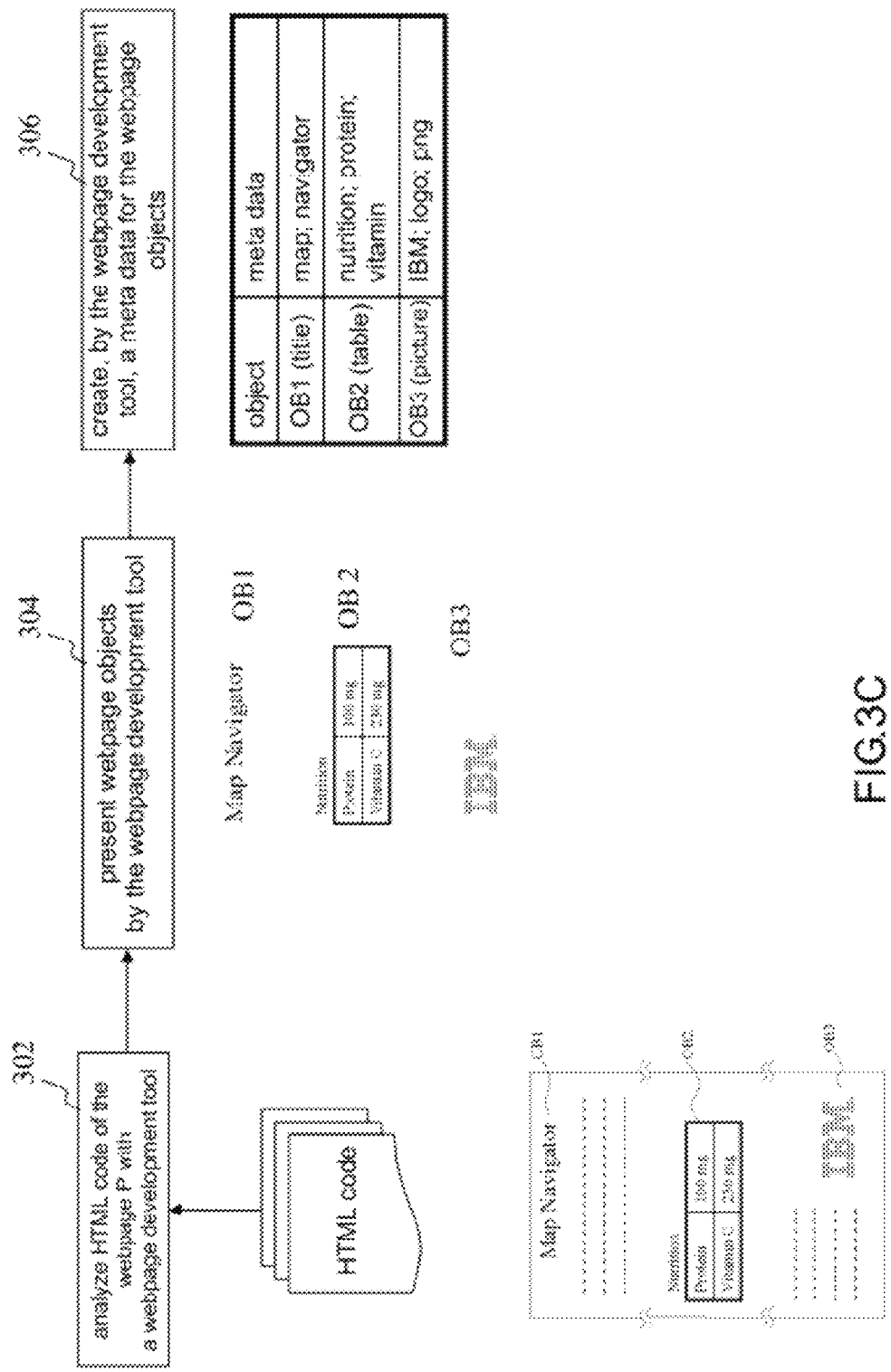
FIG. 3C further illustrates part of the steps in FIG. 3A.

In step 302, as shown in FIG. 3C, the Webpage P is analyzed with a Webpage development tool, so as to identify Webpage objects of the Webpage P automatically and determine the meta data corresponding to the Webpage objects. As indicated by the HTML code of the Webpage P, in general, Webpage objects have specific HTML tags, and thus the Webpage objects can be identified by means of the tags. In step 304, the Webpage development tool presents the Webpage objects thus identified to the Web designer for confirmation, as shown in FIG. 3C.

In step 306, the Webpage development tool creates a usable meta data in accordance with data described in object tags, as shown in FIG. 3C.

For example, as for the title object OB1, a word string in the title is treated as a meta data. As for the table object OB2, the heading in the table is treated as a meta data. As for the picture object OB3, the title, descriptive text, or picture filename of the picture is treated as a meta data. The HTML code of the Webpage P can generate the meta data shown in the table below.

| object | meta data |
| --- | --- |
| OB1 (title) | map; navigator |
| OB2 (table) | nutrition; protein; vitamin |
| OB3 (picture) | IBM; logo; png |

In the above embodiment, the type of an object is determined according to the HTML tags of the object, and then a specific data (such as the filename of a picture) of the object is selectively treated as a meta data. In another embodiment, it is feasible to ignore the type of the object and directly treat a word string in the object as a meta data.

In step 308, the Web designer determines whether to amend or additionally input a meta data of the object. In response to an affirmative determination, go to step 310 to amend or additionally input a meta data of the object. In step 312, the meta data of the object is stored as a meta data file. Step 312 is followed by step 308. If the Web designer determines not to amend or additionally input a meta data of the object, then the method will proceed to step 314 in which the Webpage development tool packages the "original" Webpage P obtained in step 300 and the meta data file finalized in step 312 and then uploads them to a Web server (not shown). Subsequent steps related to the Web server are shown in FIG. 3D.

Figure 3D:
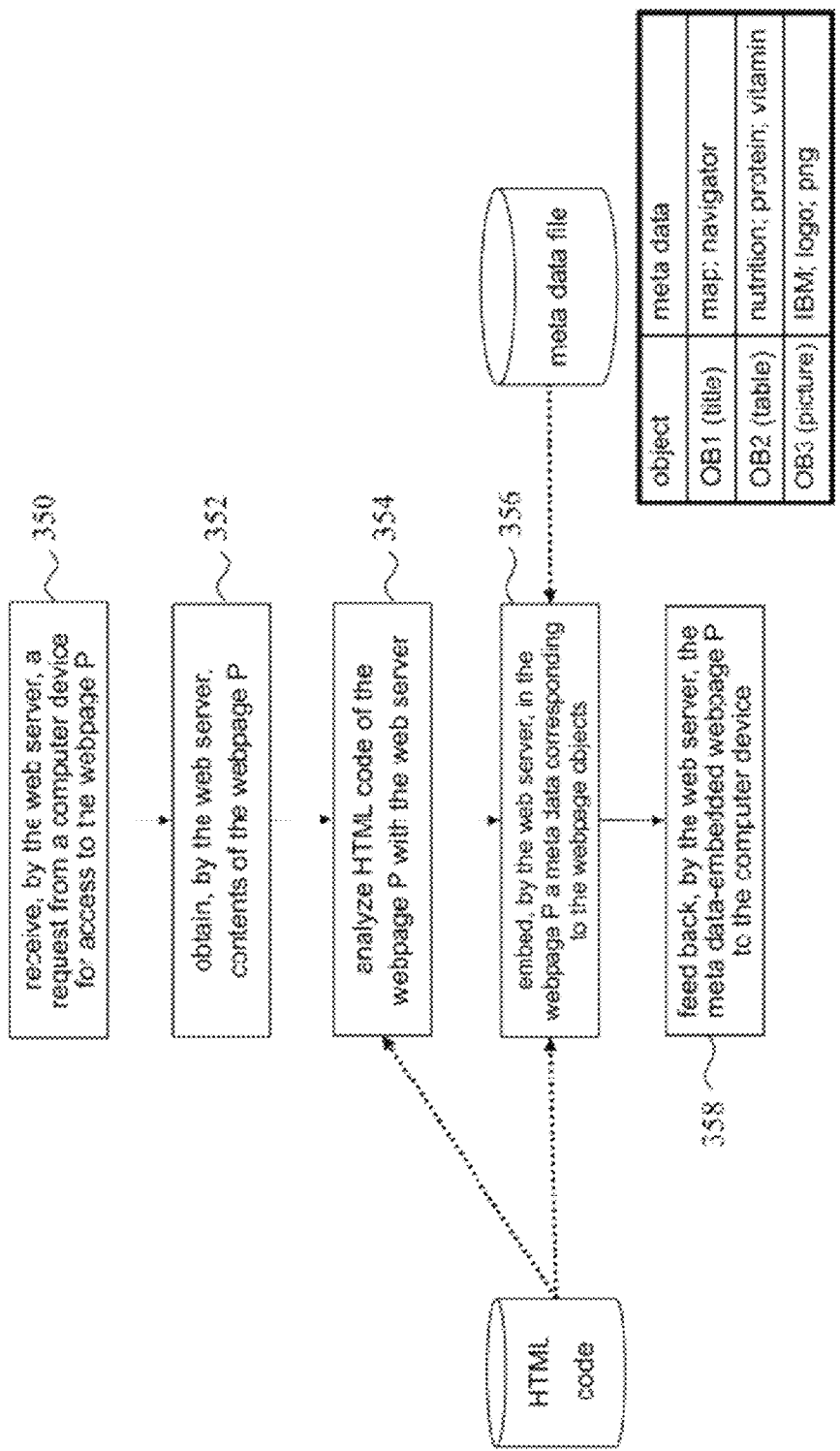
FIG. 3D is a flowchart of a method according to a specific embodiment of the present invention.
Figure 3E:
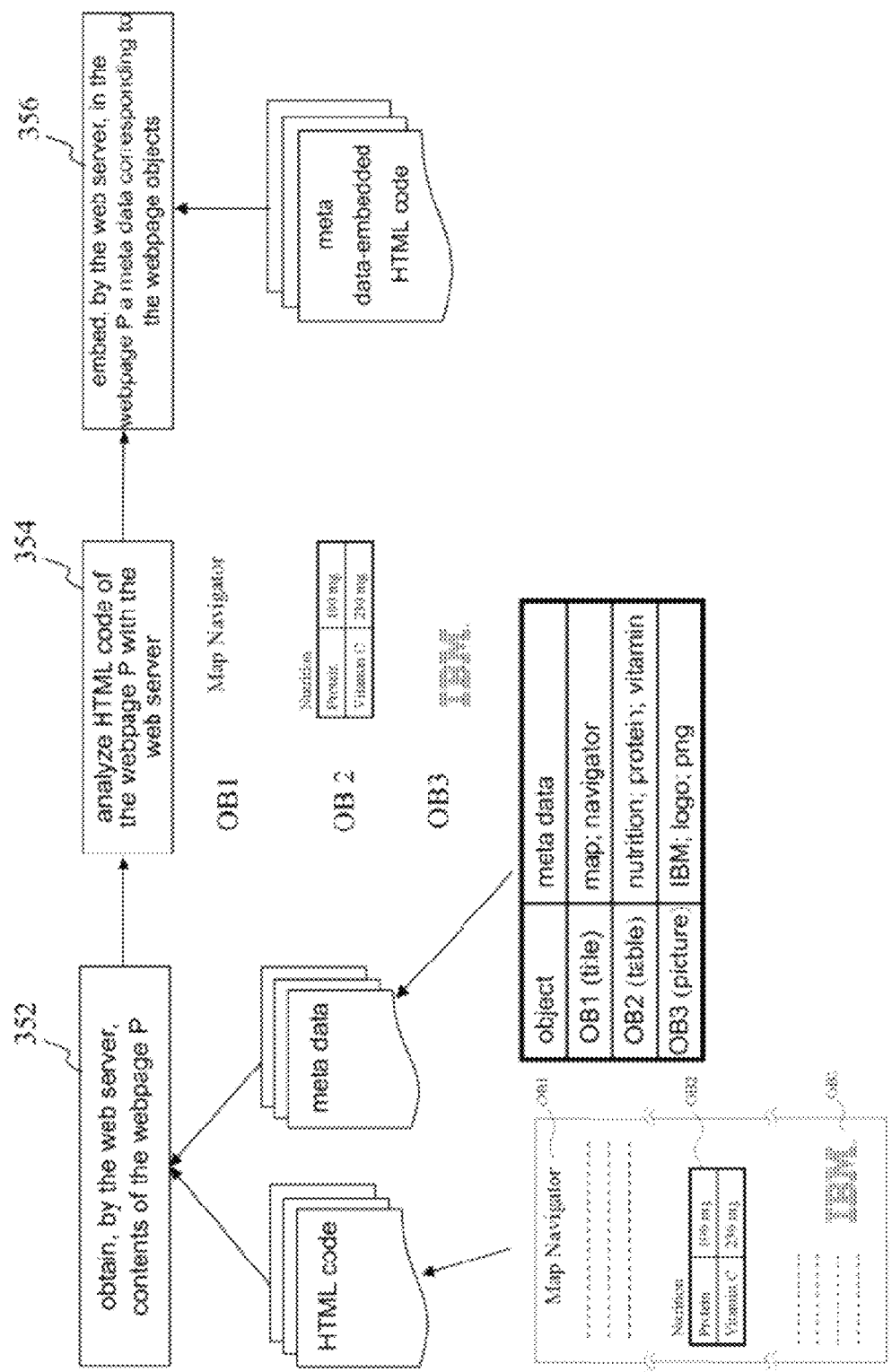
FIG. 3E further illustrates part of the steps in FIG. 3D.

Referring to FIG. 3D, in step 350, the Web server receives a request from the Webpage browsing application AP in the computer device 10 shown in FIG. 1 for access to the Webpage P. For further details of this step, please refer to the way in which conventional computer devices access Webpages from conventional Web servers. In step 352, the Web server acquires the contents of the Webpage P. In step 354, the Web server analyzes the HTML code of the Webpage P to identify the Webpage objects therein, as shown in FIG. 3E. In step 356, the Web server embeds in the Webpage P a meta data corresponding to the Webpage objects in accordance with the meta data file, as shown in FIG. 3E. An example of adding a meta data to the Webpage P is given below, wherein the HTML code of the meta data is printed in boldface. In this embodiment, although a meta data is embedded in the Webpage P by means of <meta> tags in HTML, the meta data can be embedded in the Webpage P by any other self-defined means, which is not limited by the present invention.

An example of adding a meta data to the Webpage P is given below, wherein the HTML code of the meta data is printed in boldface.

```
<html>
<head>
</head>
<body>
<h2>Map Navigator</h2><meta map="map; navigator">
<br />
<br />
Nutrition
<br />
<table style="border-collapse: collapse; width: 50%; border: 1px solid black;"> <meta map="nutrition; protein; vitamin">
    <tbody>
        <tr>
            <td style="border: 1px solid black;">Protein<br /></td>
            <td style="border: 1px solid black;">100 mg<br /></td>
        </tr>
        <tr>
            <td style="border: 1px solid black;">Vitamin C<br /></td>
            <td style="border: 1px solid black;">230 mg<br /></td>
        </tr>
    </tbody>
</table>
<br />
This is an IBM logo picture
<br />
<img border="0px" alt="IBM_Logo" title="IBM_Logo" src="http://upload.wikimedia.org/wikipedia/commons/thumb/5/51/IBM_logo.svg/120px-IBM_logo.svg.png" /><meta map="IBM; logo; png">
<br />
</body>
</html>
```

In step 358, the Web server feeds back the meta data-embedded Webpage P to the computer device 10, such that the computer device 10 can access the Web server through the Internet or any other means of connection to download the meta data-embedded Webpage P. For further details of this step, please refer to the operation of a conventional Web server, and the details are not described herein for the sake of brevity. The operation after the computer device 10 has downloaded the meta data-embedded Webpage P is illustrated with the flowchart of FIG. 4.

Application of Map Pointer Operating in Conjunction with Meta Data

Figure 4:
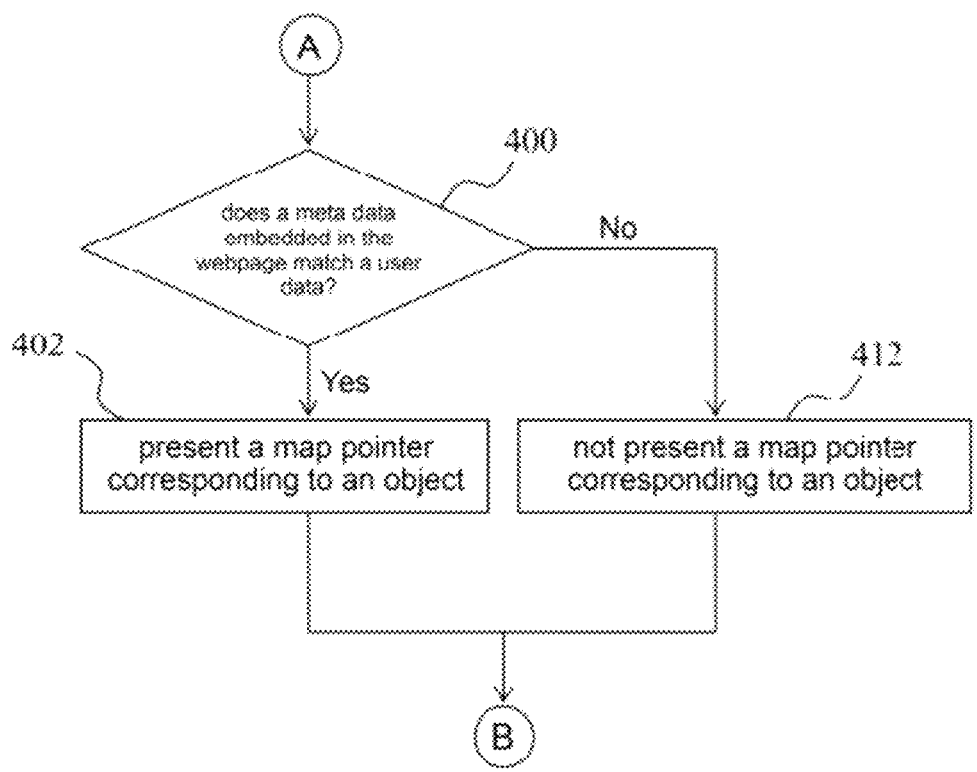
FIG. 4 is a flowchart of a method according to a specific embodiment of the present invention.

Referring to FIG. 4, there is shown a flowchart of a method according to a specific embodiment of the present invention, to further describe the details of step 204 in FIG. 2A.

Step 400 follows step 202 of FIG. 2A. In step 400, the navigation map module MM compares meta data embedded into the Webpage P in the aforesaid step 304 with a user preference data. The user preference data is stored in the device database DB beforehand according to the user's preference.

Referring to FIG. 4, in step 402 the navigation map PM shown in FIG. 2C displays the button B1 corresponding to the title object OB1 when a meta data of the title object OB1 shown in FIG. 3B matches the user preference data, and in step 412 the navigation map PM hides the button B1 when a meta data of the title object OB1 shown in FIG. 3B does not match the user preference data. The above-mentioned applies to the table object OB2 and the picture object OB3 too, and thus is not repeatedly described herein.

In doing so, the pointers (such as the buttons B1-B3) displayed in the navigation map PM enable a user to be aware of whether the Webpage P contains any information that interests the user. For example, if a user is an employee of IBM Corporation, the user will be interested in whatever information pertaining to IBM, and thus the keyword "IBM" is set to be a user preference data in the device database DB. If the keyword "IBM" in a meta data of the picture object OB3 matches the keyword "IBM" in the user preference data, the navigation map PM will display the button B3 corresponding to the picture object OB3 so as to remind the user that the Webpage P contains information that interests the user. Furthermore, in step 206 shown in FIG. 2A, the user can catch sight of the picture object OB3 quickly. In the above exemplary embodiment, in addition to the keyword "IBM", a meta data of the picture object OB3 also contains the keywords "logo" and "png", and thus the navigation map module MM can further add the keywords "logo" and "png" to the user preference data and immediately perform a comparison process on the Webpage P (or on a new Webpage as soon as it is loaded) to allow the user to know whether the Webpage contains any other information that might interest the user.

As shown in FIG. 2C, the navigation map PM has an input field TB, and the user enters "instantly" and manually a keyword for functioning as a user preference data and effectuating the comparison in step 400. In this regard, the effect of step 400 is like searching, by the navigation map module MM, a meta data embedded in the Webpage P for a keyword entered by the user.

Not only can the user enters or edits the user preference data independently, but, before step 400, the computer device 10 can be connected to another said computer device 10 (not shown), such that the user preference data in the device database DB of two said computer devices 10 can be synchronously updated. Preferably, one said computer device 10 is a handheld device (such as a mobile phone), and another said computer device 10 is a notebook computer. Please refer to iPhone™ and iTunes™ of Apple™ for processing the data of a handheld device and a personal computer synchronously; related details are omitted herein for the sake of brevity. In this regard, please refer to FIG. 6 below for further details.

In another embodiment, the user preference data need not be stored in the device database DB of the computer device 10; instead, the user preference data can be stored in a server (not shown) at a remote end by cloud technology such that, in step 400, the navigation map module MM accesses the server at the remote end to fetch the user preference data.

Figure 5:
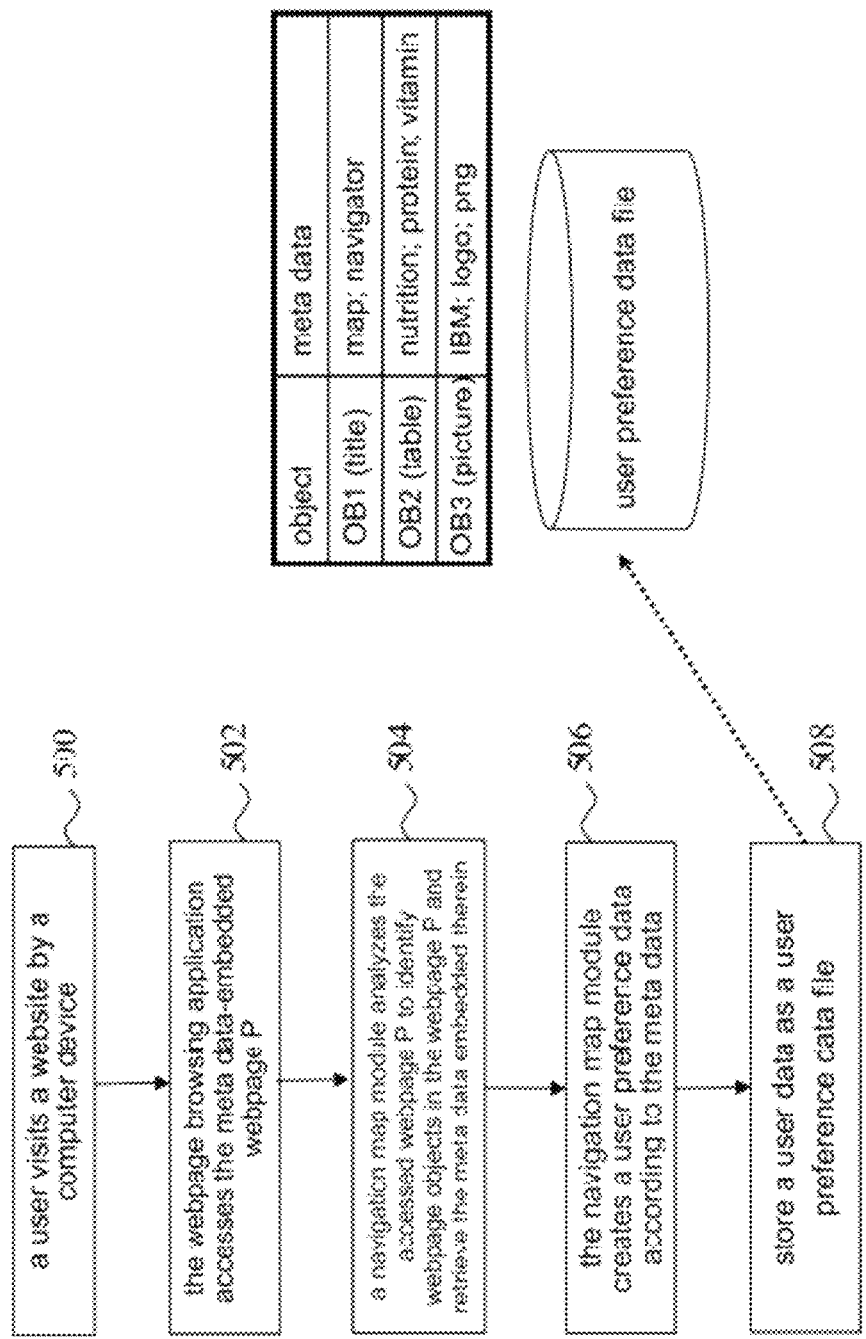
FIG. 5 is a flowchart of a method according to a specific embodiment of the present invention.

In another embodiment, the Webpage browsing application AP keeps a record of Webpages previously browsed by the user, and the navigation map module MM creates or updates the user preference data in the device database DB in accordance with the record. As shown in FIG. 5, in step 500, the user visits a Website by the computer device 10 shown in FIG. 1. In step 502, the Webpage browsing application AP accesses the meta data-embedded Webpage P on the Website (see the aforesaid description). In step 504, the navigation map module MM analyzes the accessed Webpage P (see step 302 of FIG. 3A or step 354 of FIG. 3D) in order to identify the Webpage objects in the Webpage P and retrieve the meta data embedded therein. Alternatively, the navigation map module MM does not analyze the accessed Webpage P thoroughly, but analyzes those Webpage objects which exist in the Webpage P and interest the user. If the user moves or rearranges the Webpage P to present a Webpage object at a predetermined position (such as the center) of the display area, the Webpage object can be regarded as the user's preference Webpage object; meanwhile, the navigation map module MM only needs to analyze the user's preference Webpage object and retrieve a meta data. In step 506, the navigation map module MM creates the user preference data according to the meta data retrieved in step 504 (see step 306 of FIG. 3A for further details). Afterward, step 508 involves storing the user preference data as a user preference data file for performing the comparison in the aforesaid step 400. In case of a need for comparison as described in step 400, the navigation map module MM accesses the user preference data file to obtain the user preference data. However, if the navigation map module MM only needs to analyze the user's preference Webpage object, retrieve a meta data, create the user preference data, and store it in a register (not shown), the navigation map module MM can "instantly" perform the comparison process of step 400 on the same Webpage P to allow the user to know whether the Webpage contains any other information that might interest the user, but the user preference data will not necessarily be stored as a file.

In another embodiment, the Webpage browsing application AP records keywords entered by users to a search engine (such as www.google.com) and regards the keywords as user preference data for performing the comparison process of step 400. Alternatively, a record of browsed Webpages can be stored in a server at a remote end by cloud technology, such as the "Web History" service provided by Google™, the keywords recommended by Top Search can be regarded as the user preference data for performing the comparison process of step 400.

Figure 6:
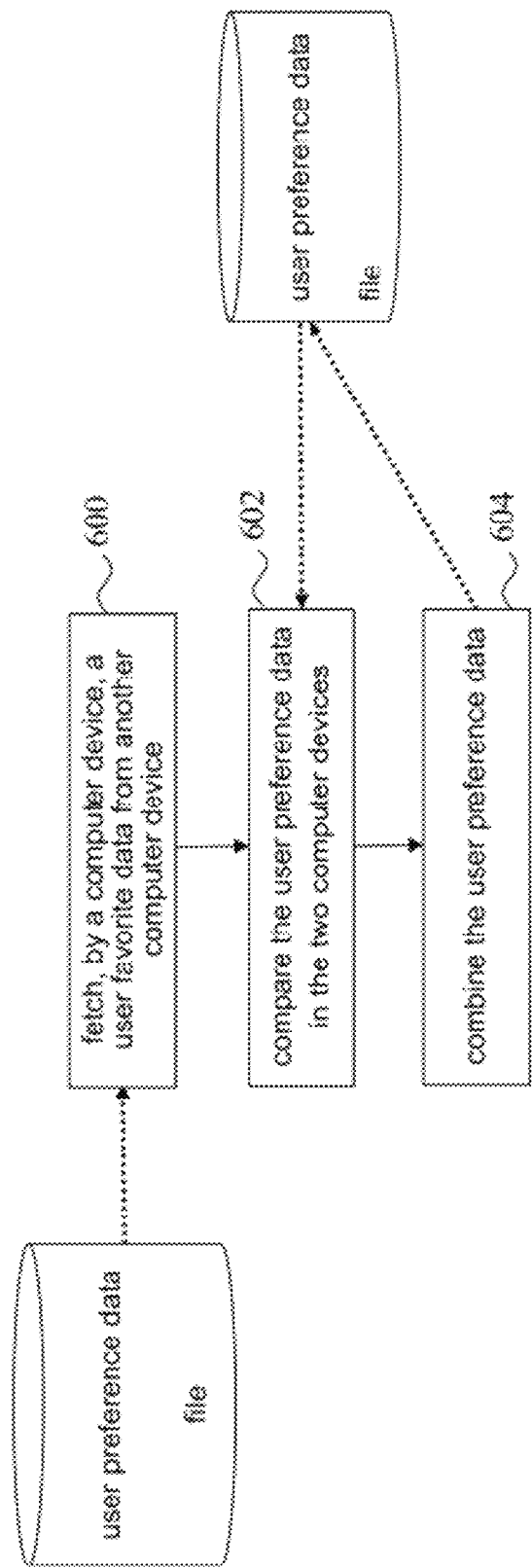
FIG. 6 is a flowchart of a method according to a specific embodiment of the present invention.

FIG. 6 is a flowchart of a method according to a specific embodiment of the present invention. As shown in FIG. 6, the computer device 10 is connected to another said computer device 10 (not shown), and the user preference data in the device database DB of two said computer devices 10 is updated synchronously. For example, preferably, one said computer device 10 is a handheld device (such as a mobile phone), and another said computer device 10 is a notebook computer.

In step 600, the navigation map module MM of a handheld device 10 fetches from a notebook computer 10 the user preference data in the device database DB. In step 602, the navigation map module MM of the handheld device 10 compares the user preference data in the device database DB of the handheld device 10 with the user preference data in the device database DB of the notebook computer 10 to determine a difference therebetween. In step 604, the navigation map module MM incorporates the user preference data in the device database DB of the notebook computer 10 into the user preference data in the device database DB of the handheld device 10 to perform the comparison in the aforesaid step 400.

Figure 7:
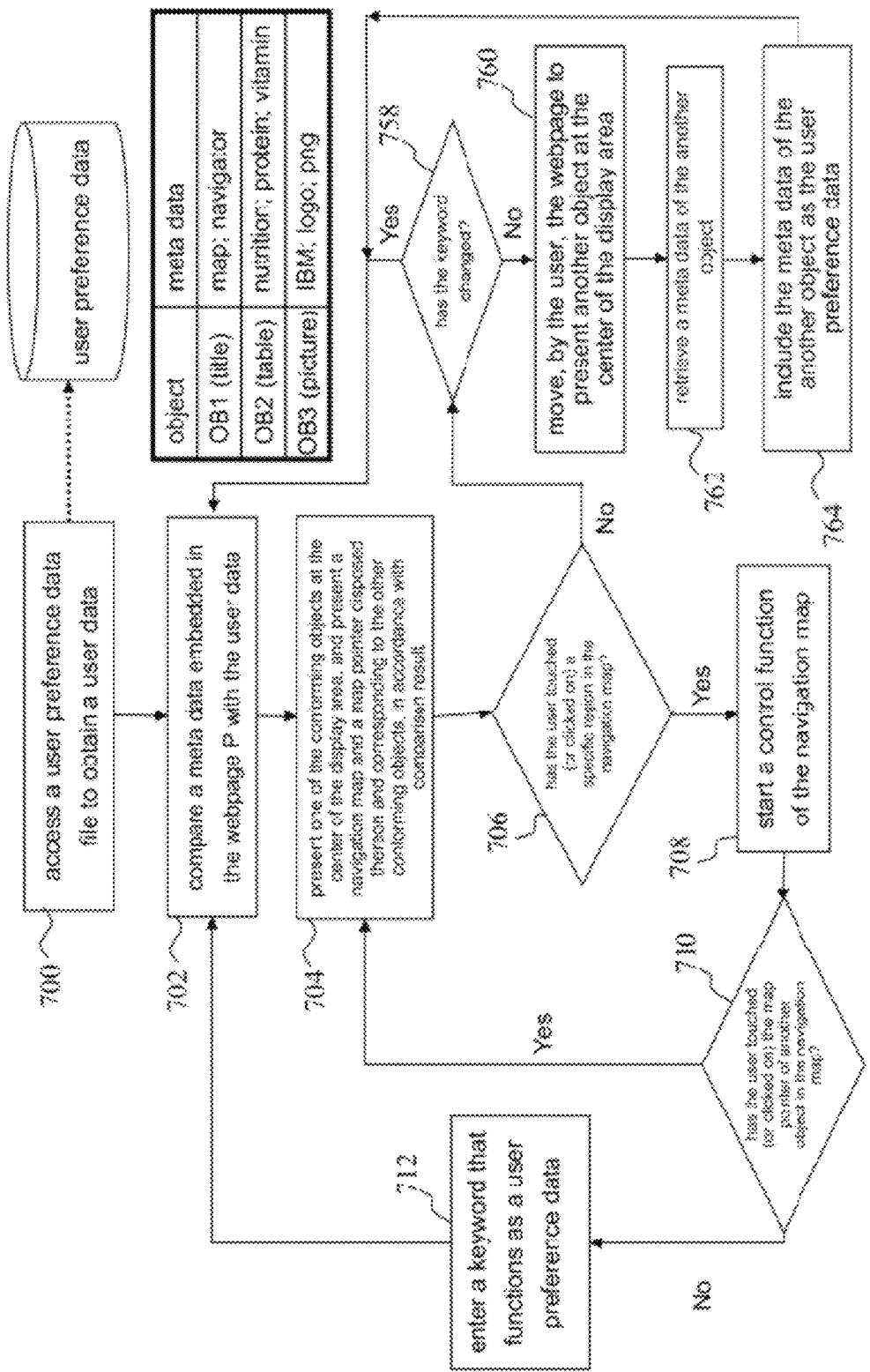
FIG. 7 is a flowchart of a method according to a specific embodiment of the present invention.

FIG. 7 is a flowchart of a method according to a specific embodiment of the present invention. As shown in FIG. 7, the operation of the Webpage browsing application AP of the computer device 10 is described in detail. In step 700, the navigation map module MM in the Webpage browsing application AP accesses the user preference data file in the aforesaid step 508 to obtain the user preference data. In step 702, the navigation map module MM compares a meta data embedded in the Webpage P with the user preference data (in a way similar to step 400). If a meta data of an object (such as the object OB2 in FIG. 2B) in the Webpage P conforms with the user data, then go to step 704 which involves presenting the conforming object OB2 at the center or any other predetermined position of the display area, presenting the navigation map PM (in a way similar to step 204), and presenting the map pointer of the navigation map PM (as shown in FIG. 2C), so as to mark other conforming objects, such as the objects OB1 and OB3, in accordance with the result of comparison. In this step, with a preset transparency it manifests, the navigation map PM covers the Webpage P. Step 706 involves determining whether the user has touched (or clicked on) a specific region in the navigation map PM. Go to step 708 in response to an affirmative determination.

In step 708, in response to the user's having touched (or clicked on) a specific region, the navigation map PM which was previously presented with a preset transparency is presented opaquely and fully in the display area, and a control function of the navigation map PM is started, so as to wait for the user to further enter a control command. Step 710 involves determining whether the user has touched (or clicked on) the button B3 (functioning as the map pointer, as shown in FIG. 2C) corresponding to the object OB3 in the navigation map PM. In case of an affirmative determination, go to step 704 in which the object OB3 is presented at the center or any other predetermined position of the display area. In case of a negative determination, go to step 712 in which the user enters a keyword into the input field TB of the navigation map PM such that the keyword functions as the user preference data. Step 712 is followed by step 702 which involves comparing a meta data embedded in the Webpage P with the user data.

Now the process flow of the method proceeds to step 706 again. If step 706 yields a negative determination, the process flow of the method will proceed to step 758 which involves determining whether the user has changed the keyword in the input field TB or entered a new keyword thereinto for functioning as the user preference data. If step 758 yields an affirmative determination, the process flow of the method will go back to step 702 which involves comparing a meta data embedded in the Webpage P with the new keyword functioning as the user preference data. If step 758 yields a negative determination, the process flow of the method will proceed to step 760 in which the user can move the Webpage P freely to browse any objects (not shown) other than the objects OB1-OB3. The objects are, for example, objects adjacent to the objects OB1-OB3. The user is likely to be attracted by objects adjacent to the objects OB1-OB3 while browsing the objects OB1-OB3, and in consequence the user manually moves the adjacent objects to the center of the display area for a browse. In step 762, a meta data corresponding to the adjacent objects and embedded therein is retrieved. In step 764, the meta data of the adjacent objects is included as the user preference data.

Step 764 is followed by step 702 in which the user preference data in the form of the meta data of the adjacent objects is compared with a meta data embedded in the Webpage P. As a result, in step 704, with the navigation map PM being equipped with the map pointer, the user can quickly realize whether the Webpage P contains any object which has the same meta data as the adjacent objects do and is worth a browse.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for facilitating navigation of a Webpage on a computer device, said computer device comprising a display, said display having a display area, said method comprising:
   loading by said computer device a Webpage having at least a first portion and a second portion;
   arranging said Webpage in order to present said first portion in said display area of said computer device and to place said second portion out of said display area; presenting a navigation map corresponding to said Webpage in said display area; and arranging said Webpage in response to a control command input with respect to said navigation map in order to present said second portion in said display area, wherein the step of presenting said navigation map further comprises: presenting a pointer corresponding to said second portion in said navigation map, wherein, in the step of arranging said Webpage in response to said control command, said control command is inputted with respect to said pointer;
   wherein a meta data of the Webpage object is embedded in the Webpage, a comparison is made between the meta data and a user preference data, wherein, in response to confirmed similarity between the meta data and the user preference data, the step of presenting said navigation map further comprises presenting the pointer corresponding to the Webpage object in said navigation map.

2. The method of claim 1, wherein the step of arranging said Webpage in response to said control command further comprises: arranging said Webpage to present said Webpage object at a predetermined position of said display area.

3. The method of claim 1, wherein, in the step of arranging said Webpage in response to said control command input with respect to said navigation map, said control command corresponds to said pointer.

4. The method of claim 3, further comprising
   inputting said user preference data by the user manually before the step of comparing said meta data with said user preference data.

5. The method of claim 3, wherein
   said computer device comprises a device database for storing said user preference data, and said method further comprising accessing said device database to obtain said user preference data before the step of comparing said meta data with said user preference data.

6. The method of claim 5, further comprising
   connecting said computer device to another computer device and updating said user preference data with data of said another computer device before the step of accessing said device database.

7. The method of claim 5, further comprising
updating said user preference data according to a record of the user's Webpage navigation before the step of accessing said device database.

8. The method of claim 3, wherein
said Webpage further comprises another Webpage object, and a meta data of said another Webpage object is further embedded in said Webpage, such that said user preference data is created according to a meta data of said another Webpage object.

9. The method of claim 3, further comprising
updating said user preference data with another portion of said meta data, if a portion of said meta data matches said user preference data.

10. The method of claim 3, wherein
said first portion further comprises a first Webpage object, and a meta data of said first Webpage object is further embedded in said Webpage, wherein, after the step of loading said Webpage by said computer device and before the step of comparing said user preference data with said meta data of said Webpage object by said computer device, said method further comprises:
  arranging said Webpage to present said first Webpage object at a predetermined position of said display area;
  retrieving a meta data of said first Webpage object in response to presenting said first Webpage object at said predetermined position; and
  treating a meta data of said first Webpage object as said user preference data.

* * * * *